United States Patent [19]
Nettli

[11] 3,936,375
[45] Feb. 3, 1976

[54] PROCESS FOR DEWATERING A PROTEINACEOUS, AQUEOUS SLUDGE AND FOR REMOVING AND RECOVERING PRECIPITATING AGENTS FROM A PRECIPITATE CONTAINING PROTEINACEOUS SUBSTANCES

[75] Inventor: Per Nettli, Asker, Norway

[73] Assignee: A/S Apothekernes Laboratorium for Specialpraeparater, Oslo, Norway

[22] Filed: Sept. 25, 1974

[21] Appl. No.: 509,317

Related U.S. Application Data

[63] Continuation-in-part of Ser. No. 342,798, March 19, 1973, abandoned.

[30] Foreign Application Priority Data
Mar. 20, 1972 Norway................................ 903/72

[52] U.S. Cl. .................... 210/45; 210/52; 210/56; 260/112 R; 260/112 B
[51] Int. Cl.² .......................................... C02B 1/20
[58] Field of Search ............ 210/45, 47, 49, 46, 56, 210/51, 52, 53, 42; 260/112 R, 112 B, 122

[56] References Cited
UNITED STATES PATENTS

| | | | |
|---|---|---|---|
| 2,328,361 | 8/1943 | Sanders | 210/56 |
| 2,744,014 | 5/1956 | Greathouse et al. | 210/56 |
| 3,491,080 | 1/1970 | Ehrensvärd et al. | 260/112 R |
| 3,681,283 | 8/1972 | Yueh | 260/112 R |
| 3,738,933 | 6/1973 | Hollo et al. | 210/53 |

Primary Examiner—Charles N. Hart
Assistant Examiner—Benoit Castel
Attorney, Agent, or Firm—Haseltine, Lake & Waters

[57] ABSTRACT

A proteinaceous aqueous sludge, previously precipitated with a precipitating agent, is mixed with calcium chloride, and treated with a base selected from the group consisting of alkali metal hydroxides and alkaline earth metal hydroxides to adjust the pH to a value in the range of 6.5–9.5. The mixture is then heated to a temperature in the range of 60°–120°C. to coagulate and agglomerate the sludge, which is then separated from the aqueous phase containing the precipitating agent.

10 Claims, 5 Drawing Figures

PROCESS FOR DEWATERING A PROTEINACEOUS, AQUEOUS SLUDGE AND FOR REMOVING AND RECOVERING PRECIPITATING AGENTS FROM A PRECIPITATE CONTAINING PROTEINACEOUS SUBSTANCES

This application is a continuation-in-part of copending application Ser. No. 342,798, filed Mar. 19, 1973, now abandoned.

It is well known that a number of substances can be used as precipitating agents on an industrial scale to remove proteins from effluents such as process water. The principal group of precipitating agents in use is probably the lignin sulphonic acids and their derivatives. A number of installations based on the use of lignin sulphonic acids have been built in many countries and these installations are employed to purify industrial effluents while recovering a substantial quantity of the proteins, see U.S. Pat. No. 3,390,999. Other organic substances that have been used as precipitating agents are organic sulphonates, such as aryl or aryl alkyl sulphonic acids, as described in Canadian Pat. No. 882,398, and organic sulphates, such as sulphuric acid esters or monovalent and polyvalent alcohols, such as lauryl sulphate, glyceryltrisulphate and sulphated hexavalent alcohols and sulphated hexavalent carbohydrates, reference here being made to Norwegian Pat. No. 117,339 and Canadian Pat. No. 887,899. Most of these organic sulphonic acids and sulphates have a very good purifying effect, but to use them for purifying water on an industrial scale involves relatively high costs for chemicals.

Conventional methods of flocculation by the use of metal salts as e.g. aluminum sulphate and iron chloride have also been used for flocculation of waste water containing proteins, and preferably in combination with organic flocculating agents as e.g. polyacrylamides.

The previously known and above mentioned patented methods of precipitation and flocculation of waste water containing proteins renders it possible to remove the separated proteinaceous organic material by sedimentation or flotation. After said removal the separated proteinaceous material is present as an aqueous sludge containing approximately 5–10 % by weight of solids.

Dependent on the character of the precipitating or flocculating agent the separated proteinaceous sludge can be used as an additive to cattle feed, Danish Pat. No. 112,149, or it can be further treated as a conventional waste sludge. In both cases, however, its high water content and consequently its large volume makes it difficult or simply impossible to solve the sludge problem.

Proteins precipitated by means of the said agents can be used as fodder. It would, however, be an advantage if it were possible to lessen the content of said precipitating agents. By reducing the amount of precipitating agents in the precipitate, one would be able at the same time to increase the protein content and thus the commercial value of the material as fodder.

Sludge produced by precipitation or flocculation of effluent proteins by addition of lignosulphonic acid and reduction of the pH to the range 2–4 can have concentrations of more than 10 % of solids. This is a recognized additive to cattle feed, but due to the too high water content still present, it cannot be directly used as a raw material for meat and bone flour production.

It would thus be desirable to find a process which renders it possible to concentrate a proteinaceous sludge. It is known that many proteins coagulate when heated. The proteinaceous sludges obtained by chemical precipitation or flocculation of proteinaceous effluent, however, coagulate or agglomerate poorly or not at all when heated.

The object of the present invention is thus to condition proteinaceous sludges by addition of a suitable coagulating agent, so that heating of the sludge being conditioned in this manner yields a rapid and satisfactory coagulation and agglomeration of proteinaceous organic material, and the coagulated material can be removed by sedimentation, preferably in a centrifuge.

This object was surprisingly achieved by the process according to the present invention, which provides a method for treating a proteinaceous sludge and comprises a chemical-thermal combination method yielding a concentrated proteinaceous sludge with a high content of solids simultaneously with the utilized precipitating agent going into solution in the separated aqueous phase and thus renders it possible to recover said precipitating agents.

DESCRIPTION OF DRAWINGS

In order to understand the present invention more fully, attention is directed to the accompanying drawings which are to be entered in conjunction with the Specification and wherein.

Figure 1:
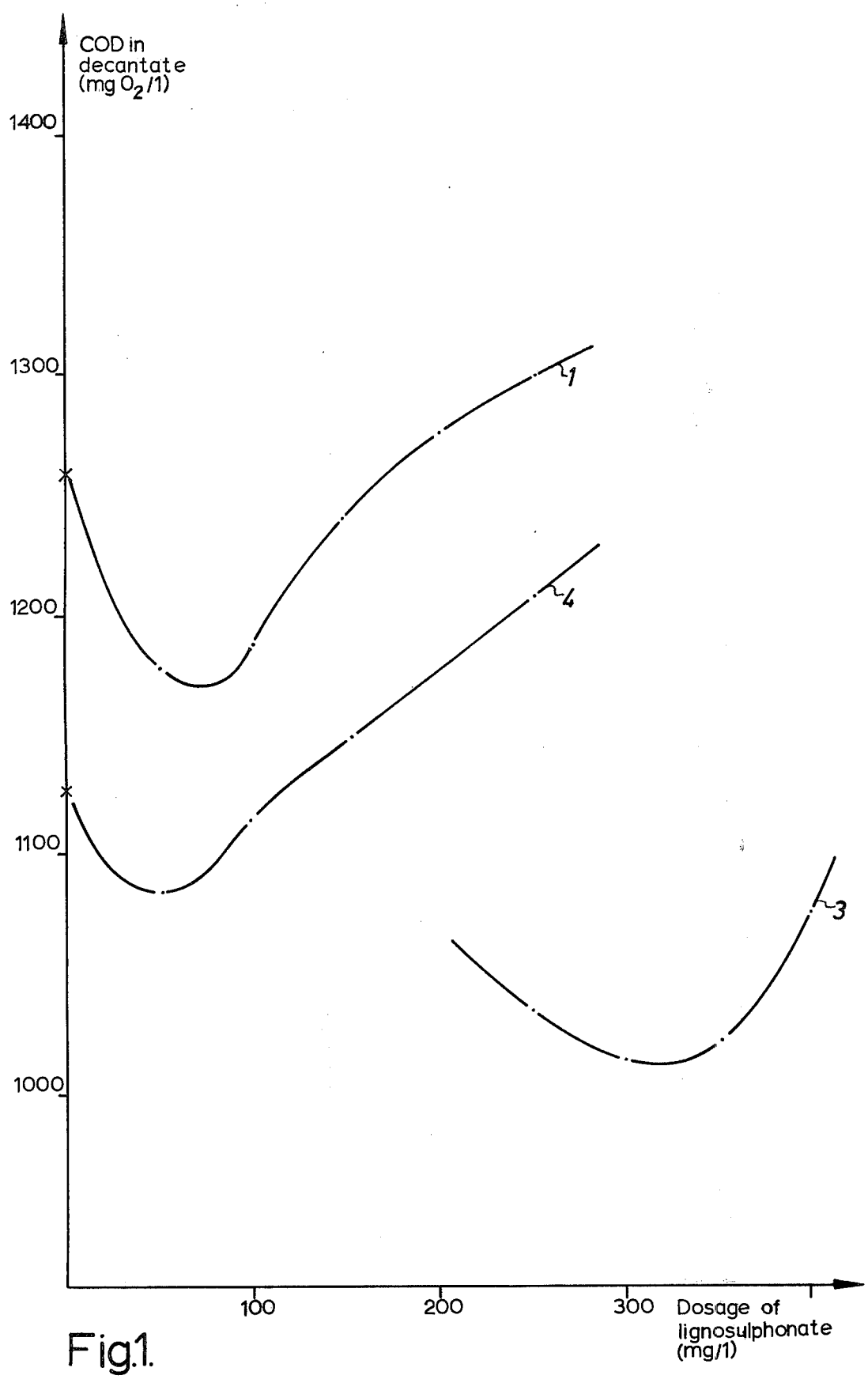
FIG. 1 is a diagrammatic graph illustrating the different effects of dosages of lignosulphonate on protein solutions, diagram 1 showing the effects of optional dosage thereof, diagram 3 the effects of overdosage thereof and diagram 4 the effects of using centrifugate as precipitating agent, as set forth in the Table of EXAMPLE I.

By the process according to the present invention an alkaline earth compound is added to the protein sludge and, if necessary, an alkali metal hydroxide or alkaline earth metal hydroxide is added until a pH of about 7–9 is obtained, followed by heating, during which the protein complex formed from the precipitating agents and proteins splits, whereupon the proteins coagulate as an alkaline earth proteinate and the precipitating agent dissolves in the separated hydrous phase. By washing the coagulated material, it is moreover possible to recover the precipitating agents almost quantitatively. If alkaline earth hydroxide, e.g. $Ca(OH)_2$, is used alone before the protein sludge is heated, a smaller proportion of the precipitating agent is dissolved and consequently less precipitating agent is recovered, probably because the calcium salts of the said precipitating agents are less soluble. One advantage of calcium alone is, however, that the coagulated material has a firmer consistency and separates better; it is, for example, easier to filter.

By using an alkaline earth salt in a quantity sufficient to form an alkaline earth proteinate and alkali hydroxide adequate for neutralization, the precipitating agent will dissolve as an alkali salt that is highly soluble and thus makes it possible to recover the precipitating agent almost quantitatively.

According to the present invention the proteinaceous material is also supplied with heat coagulable protein, whereafter the mixture is agitated and heated to a temperature of at least 60°C, preferably by the aid of steam supplied directly to the pretreated sludge, and the separated water is removed, preferably in a centrifuge or a desludger.

Thus blood, which is a heat-coagulable protein, is added to this proteinaceous sludge. Said mixture is slowly heated with thorough agitation until coagulation begins. A continuous flow of said mixture is then rapidly heated to 70°–100°C, whereupon the separated water is removed in a manner known per se. In this manner a good separation of concentrated proteinaceous material is achieved with a content of solids of approximately 40%.

The addition of a heat-coagulable protein also contributes to a better coagulation and dewatering but best results are achieved with a combination of heat-coagulable protein and alkaline earth compounds at a pH about 7–9.

EXAMPLE I

The sludge used for the experiment was ligno-protein slude separated by precipitation of proteins in slaughterhouse effluents with 14.5% solids.

The sludge had a pH of 4.1 and calcium hydroxide was added to raise the pH to 8.0. The sludge was then heated to a temperature of 95°C, at which temperature the sludge coagulated. After a suitable interval and reaction time, centrifugation of the sludge was carried out and the centrifugate was thereafter used as precipitating agent for a protein solution for which the optimal dosage of pure ligno-sulphonic acid was known. A certain quantity of the centrifugate was added to the protein solution together with varying quantities of ligno-sulphonic acid. The protein material in the solution was precipitated and organic substance was measured in the resulting decanate by determining COD (a measure of oxygen demand).

Slaughterhouse effluents of the same quality as used to precipitate the ligno-protein sludge being examined, were used as the protein solution for the recovery test.

The results of the experiment are shown in the following table.

TABLE FOR EXAMPLE I

Figure 2:
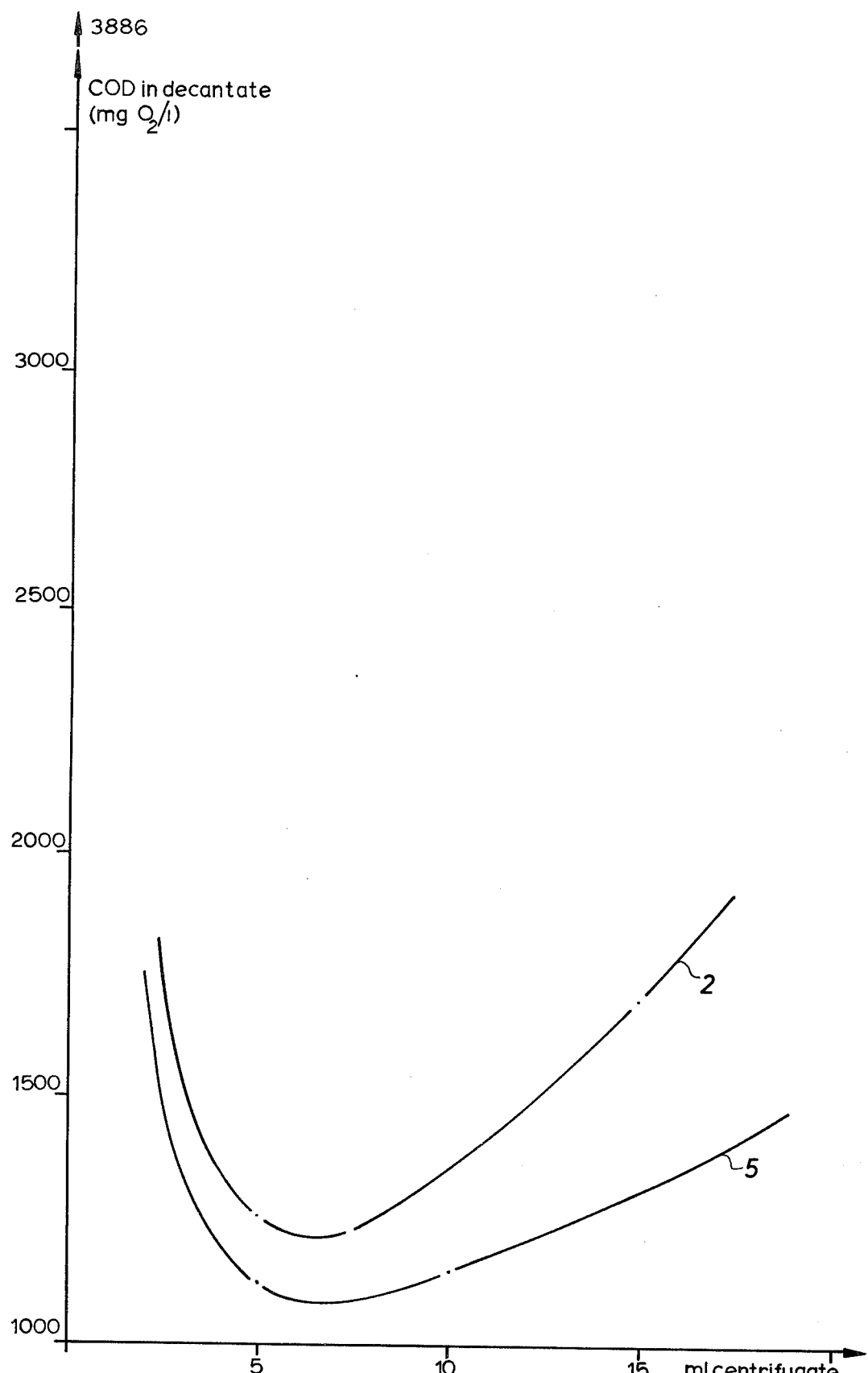
FIG. 2 is a diagrammatic graph illustrating the effects of using EXAMPLE I centrifugate alone to precipitate protein, diagram 2, as compared to the effects of using EXAMPLE II centrifugate alone in overdose amounts, diagram 5, as set forth in the Table for EXAMPLE II.

| Dosage (for 500 ml protein solution) | | | COD in decan- tate mg O$_2$/l | % COD reduction | Diagram No. FIG. No. |
|---|---|---|---|---|---|
| Lignosul- phonate mg/l | Sulphuric acid mg/l | Centri- fugate ml | | | |
| 0 | 0 | 0 | 4690 | 0 | |
| 0 | 600 | 0 | 3886 | 17.14 | |
| 0 | 700 | 5 | 1259 | 73.15 | |
| 50 | '' | '' | 1178 | 74.89 | |
| 100 | '' | '' | 1189 | 74.64 | 1 |
| 150 | '' | '' | 1239 | 73.59 | FIG. 1 |
| 200 | '' | '' | 1276 | 72.79 | |
| 250 | '' | '' | 1300 | 72.29 | |
| 0 | 600 | 0 | 3886 | 17.14 | |
| 0 | 700 | 5 | 1259 | 73.15 | 2 |
| 0 | '' | 10 | 1341 | 71.41 | FIG. 2 |
| 0 | '' | 15 | 1706 | 63.64 | |
| 250 | 600 | 0 | 1036 | 77.91 | |
| 300 | '' | 0 | 1016 | 78.34 | 3 |
| 350 | '' | 0 | 1022 | 78.20 | FIG. 1 |
| 400 | '' | 0 | 1075 | 77.07 | |

The table and diagrams clearly show that the centrifugate contains a large quantity of recovered precipitating agent. Precipitation of protein solution with centrifugate alone gave the best result when 5 ml centrifugate was added to 500 ml protein solution. In this case COD reduction is 73.15 % as against 17.14 % when only sulphuric acid was added. Diagram 2, FIG. 2 shows that the optimal quantity of centrifugate for precipitation of protein solution should be about 8 ml per 500 ml, whereby one would obtain a COD number in the decantate of about 1.190 mg O$_2$/l, corresponding to a COD reduction of about 74.6 %. Comparing this with the extrapolated part of diagram 3, FIG. 1, it should be possible to set the quantity of recovered precipitating agent as being equivalent to a dosage of about 175 mg/l or about 87 mg/500 ml. This means that the concentration of precipitating agent in the centrifugate should be approx. 87/8 mg/ml or approx. 10 g/l.

Diagram 1, FIG. 1, shows that the optimal dosage of ligno-sulphonate in addition to 5 ml centrifugate per 500 ml is about 70 mg/l. If more ligno-sulphonate is added, precipitation of protein solution will be less effective owing to overdosage. This over-dosage effect can clearly be seen from diagram 3, FIG. 1, which shows 300 mg/l as the optimal ligno-sulphonate dosage. As COD reduction is not improved by adding more than about 70 mg/l ligno-sulphonate in addition to 5 ml centrifugate (see diagram 1), one can assume that recovered precipitating agent in the centrifugate is equivalent to a dosage of about 300 − 70 = 230 mg/l, or approx. 115 mg per 500 ml. Based on this assumption, the centrifugate added contains 115/5 mg/ml or approx. 20 g/l.

EXAMPLE II

A certain quantity of calcium chloride was added to the same sludge as used for Example I, followed by the use of sodium hydroxide to adjust pH to 8.0. The sludge was then heated to 95°C, when coagulation occurred, and after a suitable interval and reaction time at this temperature the specimen was subjected to centrifugation. The centrifugate was analyzed and used as a source for ligno-sulphonate by adding a certain quantity to a protein solution and whereupon varying quantities of lignosulphonic acid were added. Unexpectedly it proved that better precipitation of the proteins was achieved by using this centrifugate as precipitating agent, so that the resulting hydrous phase was clear and clean. The hydrous phase of the specimens was analyzed for COD to obtain an indication of the recovery of protein precipitating agent.

The results of the test are given in the following table.

TABLE FOR EXAMPLE II

| Dosage (for 500 ml protein solution) | | | | | |
|---|---|---|---|---|---|
| Lignosulphonate mg/l | Sulphuric acid mg/l | Centrifugate ml | COD in decantate mg O$_2$/l | % COD reduction | Diagram No. FIG. No. |
| 0 | 0 | 0 | 4690 | 0 | |
| 0 | 600 | 0 | 3886 | 17.14 | |
| 0 | 700 | 5 | 1126 | 75.99 | |
| 50 | '' | '' | 1084 | 76.88 | |
| 100 | '' | '' | 1117 | 76.18 | 4 |
| 150 | '' | '' | 1148 | 75.52 | FIG. 1 |
| 200 | '' | '' | 1173 | 74.98 | |
| 250 | '' | '' | 1210 | 74.20 | |
| 0 | 700 | 5 | 1126 | 75.99 | |
| 0 | '' | 10 | 1146 | 75.56 | 5 |
| 0 | '' | 15 | 1312 | 72.02 | FIG. 2 |

The results from Example II can best be compared with the results from Example I by comparing diagram 4, FIG. 1, (Ex. II) with diagram 1, FIG. 1, (Ex. I) and diagram 5, FIG. 2, (Ex. II) with diagram 2, FIG. 2, (Ex. I). In relation to diagram 1, diagram 4 shows that in Example II a better COD reduction is obtained than in Example I and that the optimal dosage is somewhat lower than in Example I. This means that the centrifugate produced by coagulation with CaCl$_2$ and NaOH contains more precipitating agent than in Example I.

This is further illustrated by comparing the results from the protein precipitation test with centrifugate alone. Diagram 5, FIG. 2, (Ex. II) lies clearly below diagram 2, FIG. 2, (Ex. I), which shows that the specific COD reduction is better with centrifugate from Ex. II. Furthermore, diagram 5, FIG. 2, rises less than diagram 2, FIG. 2, when the quantity of centrifugate exceeds the optimal dosage, which means that the proportion of substances without protein precipitating properties is less in the centrifugate from Example II than in that from Example I.

EXAMPLE III

Varying quantities of calcium hydroxide were added to three specimens of the same sludge as used in Examples I and II, to obtain pH numbers 7, 8 and 9 respectively before coagulation at 95°C. Centrifugation was carried out as in Example I and the centrifugates were examined as described in Examples I and II.

The results of the test are given in the following table.

TABLE FOR EXAMPLE III

Figure 3:
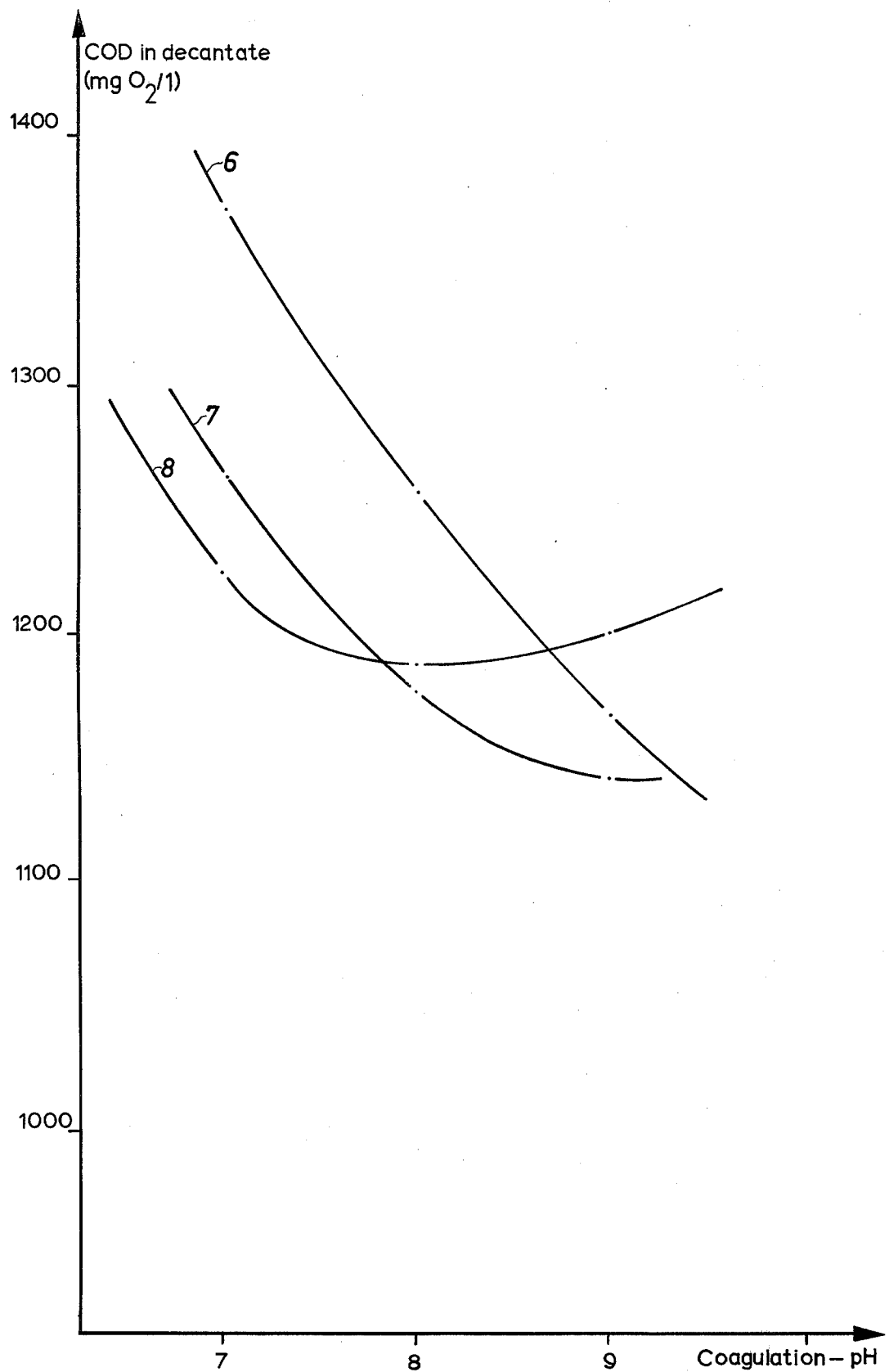
FIG. 3 is a diagrammatic graph illustrating the effects of precipitating protein with precipitate alone or pH increase, diagram 6, as component to added dosages of 50 and 100 mg/l of lignosulphonate, diagrams 7 and 8, respectively, as set forth the Table for EXAMPLE III.

| pH when coagulated | Dosage (for 500 ml protein solution) | | | COD in decantate mg O$_2$/l | % COD reduction | Diagram No. FIG. No. |
|---|---|---|---|---|---|---|
| | Lignosulphonate mg/l | Sulphuric acid mg/l | Centrifugate ml | | | |
| 7 | 0 | 700 | 5 | 1.372 | 70.74 | |
| 8 | 0 | 700 | 5 | 1.259 | 73.16 | 6 |
| 9 | 0 | 700 | 5 | 1.168 | 75.09 | FIG. 3 |
| 7 | 50 | 700 | 5 | 1.265 | 73.02 | |
| 8 | 50 | 700 | 5 | 1.178 | 74.88 | 7 |
| 9 | 50 | 700 | 5 | 1.143 | 75.62 | FIG. 3 |
| 7 | 100 | 700 | 5 | 1.225 | 73.88 | |
| 8 | 100 | 700 | 5 | 1.189 | 74.64 | 8 |
| 9 | 100 | 700 | 5 | 1.202 | 74.37 | FIG. 3 |

Figure 4:
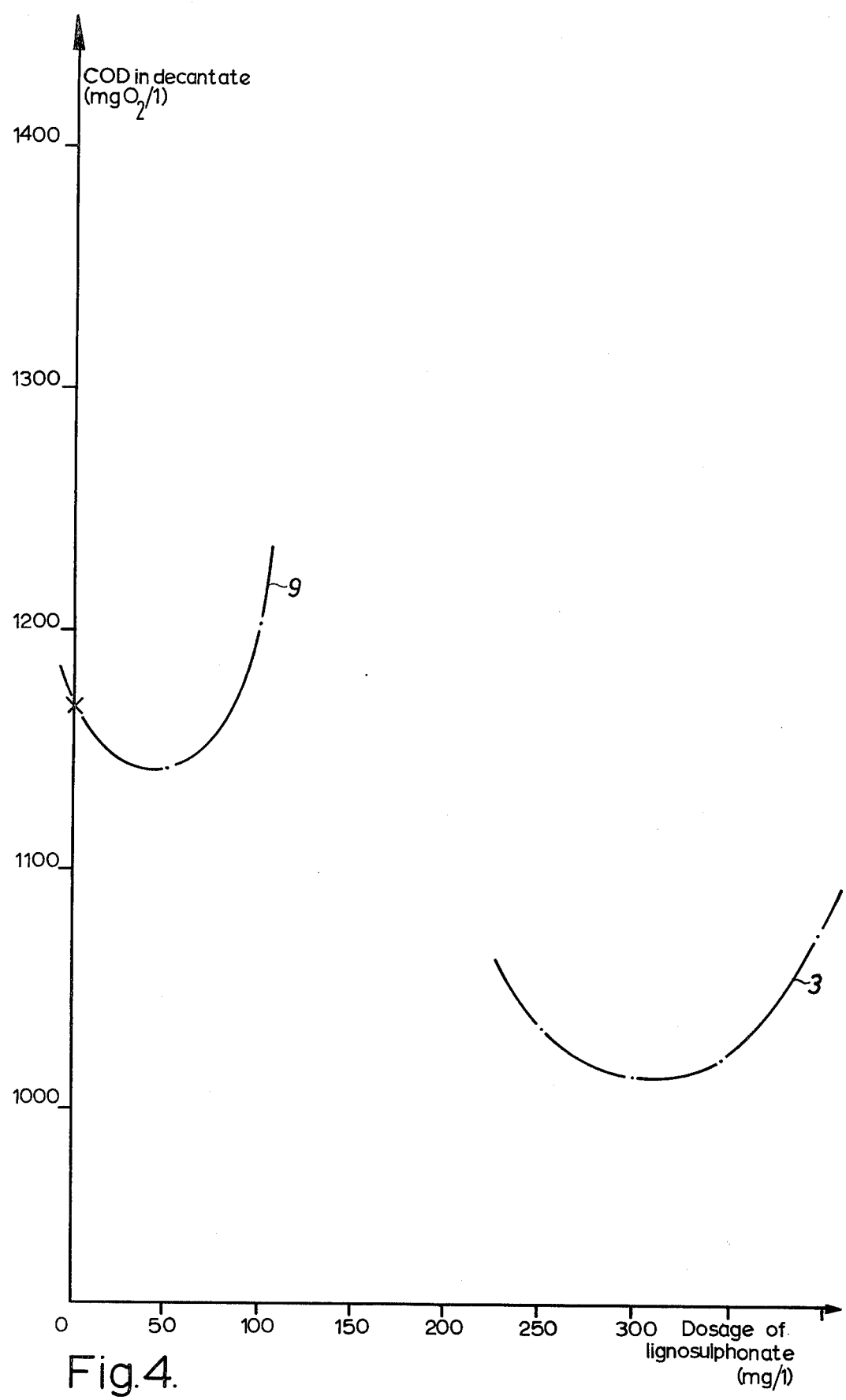
FIG. 4 is a diagrammatic graph illustrating the effects of an additional 100 mg/l of centrifugate of pH 9, diagram 9, in comparison to an optional 50 mg/l lignosulphonate dosage, diagram 3.

Comparing the results here in the same way as in Examples I and II gives an indication of the dependence upon or significance of the pH for coagulation of the precipitated protein material. Diagram 6, FIG. 3, which shows the protein precipitation test with centrifugate alone, indicates a distinct improvement in precipitation effect for centrifugate from coagulation as the pH increases. Diagram 7 and 8 in FIG. 3 with 50 and 100 mg/l respectively of additional lignin sulphonate dosage show that an additional dosage of 50 mg/l to 5 ml centrifugate increases COD reduction as compared with centrifugate alone, but that there is very little increase for the centrifugate from coagulation at pH 9. On the other hand, with an additional dosage of 100 mg/l, the COD reduction obtained with the centrifugate from coagulation at pH 9 is worse. Diagram 9, FIG. 4, illustrates this, clearly showing that the optimal additional lignin sulphonate dosage in addition to 5 ml centrifugate is approx. 50 mg/l. If this result is appraised in the same manner as in Example I, one can assume that the quantity of recovered precipitating agent in the centrifugate from coagulation at pH 9 is equivalent to a dosage of 300 − 50 = 250 mg/l, or that the concentration of precipitating agent in the added centrifugate is 125/5 mg/l or 25 g/l, which is 25 % more than the concentration in the corresponding centrifugate from coagulation at pH 8 (Example I).

EXAMPLE IV

Four specimens each of 100 grams of the same lignoprotein sludge as in examples I, II and III were coagulated at 95°C after the addition of $CaCl_2$ and NaOH to two specimens and $Ca(OH)_2$ alone to two specimens, whereby pH was adjusted to 9.

Dehydration of the specimens was done in two different ways, so that one specimen conditioned by $CaCl_2$ and NaOH and one specimen conditioned by $Ca(OH)_2$ alone were subjected to centrifugation as in the preceding examples, while the two remaining specimens with different conditioning were filtered through a fibreglass filter Whatman GF/C and washed twice with 50 ml water. The quantities of the centrifugate and filtrate were measured and the concentration of precipitating agent was determined by protein precipitation tests as in the preceding examples.

RESULTS

| Conditioning | Dehydration method | Hydrous phase quantity ml | Precipitating agent, yield Concentration mg/ml | Recovered mg | % yield |
|---|---|---|---|---|---|
| $CaCl_2$ + NaOH | Centrifuge | 58 | 35 | 2.030 | 66.6 |
| $CaCl_2$ + NaOH | Filter | 121 | 20 | 2.420 | 79.5 |
| $Ca(OH)_2$ | Centrifuge | 72 | 25 | 1.800 | 59.1 |
| $Ca(OH)_2$ | Filter | 150 | 15 | 2.250 | 73.9 |

In addition filtration speed and volume yield were examined by using cold (15°C) and warm (65°C) water for washing out the coagulated material. Furthermore tests were carried out by adding cold water (15°C) after coagulation and by stirring to cool the material before separation. These additional tests showed as expected that filtration speed and yield volume are greatest when warm water is used for washing out the coagulated material, but by adding cold water and stirring before separation one obtained greater filtration speed and yield volume for the hydrous phase. Cooling the material to about 50°C before separation therefore appears advantageous.

The yield volumes for centrifugation and filtration show that separability is best for sludge conditioned by $Ca(OH)_2$ alone, while the precipitating agent yield shows that conditioning with $CaCl_2$ and NaOH before coagulation gives best recovery of precipitating agent from the protein material.

According to the consumption of lignin sulphonate for producing the sludge and according to the residue analysis of lignin sulphonate in the effluents treated, the lignoprotein sludge containing 14.5 % solids, contains in the solids 21 % lignin sulphonate, which is equivalent to 14.5 × 0.21 = 3.045 mg lignin sulphonate in 100 g sludge. As the table shows, for coagulated sludge conditioned by $CaCl_2$ + NaOH or by $Ca(OH)_2$ alone, the recovered yield of precipitating agent can by washing be increased from 66.6 to 79.5 % and 59.1 to 73.9 % respectively by washing out with water.

EXAMPLE V

To examine the possibility of removing other precipitating agents from precipitated protein material, different types of protein sludge were produced by precipitation of effluents containing proteins, using the following precipitation agents:

Lauryl sulphate
Glyceryl trisulphate
Dodecyl-benzene-sulphonic acid
Aluminum sulphate The same slaughterhouse effluents were used, with COD = 4.590 mg/$O_2$/l, as for the production of lignoprotein sludge in the four preceding examples. Parallel tests were carried out with effluents from destructive plant for slaughterhouse waste (production of meat-bone meal and technical fats) and with diluted blood water from pig slaughtering.

The separated sludge was brought to pH 9 by the addition of $Ca(OH)_2$, coagulated at 95°C, and centrifugation was carried out. The centrifugates from the different types of sludge were subjected to the same protein precipitation tests as the preceding examples, 5, 10 and 15 ml being used as precipitating agent for the same slaughterhouse effluents as described in the preceding examples. Sulphuric acid was added to obtain pH = 3 for all precipitations except precipitation of the centrifugate from the sludge precipitated by aluminum sulphate, for which the pH was adjusted to 6. The decantates from the protein precipitation tests were characterized by determining COD which served for calculating the amount of precipitating agent recovered.

RESULTS

Figure 5:
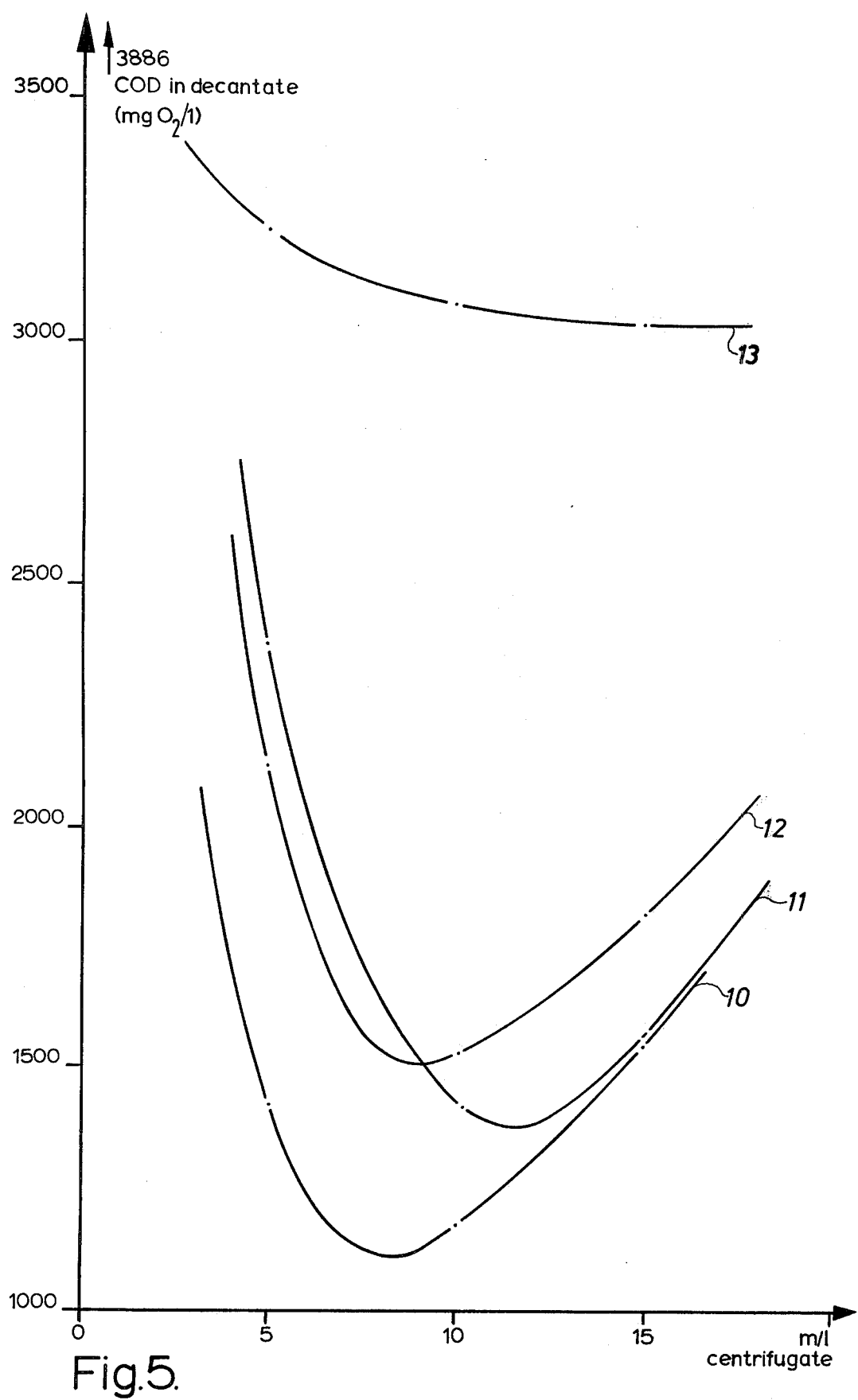
FIG. 5 is a diagrammatic graph illustrating the use of other precipitating agents for protein as shown in Tabular Results in EXAMPLE V.

| Precipitation agent | Dosage of centrifugate for 500 ml ml | COD in decantate mg $O_2$/l | % COD reduction | Diagram No. FIG. No. |
|---|---|---|---|---|
| Lauryl sulphate | 5 | 1.426 | 68.9 | |
| | 10 | 1.172 | 74.5 | 10 |
| | 15 | 1.542 | 66.4 | FIG. 5 |
| Glyceryl trisulphate | 5 | 2.380 | 48.1 | |
| | 10 | 1.438 | 68.7 | 11 |
| | 15 | 1.567 | 65.8 | FIG. 5 |
| Dodecyl-benzene sulphonic acid | 5 | 2.135 | 53.5 | |
| | 10 | 1.529 | 66.7 | 12 |
| | 15 | 1.813 | 34.0 | FIG. 5 |
| Aluminum sulphate | 5 | 3.220 | 29.8 | |
| | 10 | 3.072 | 33.0 | 13 |
| | 15 | 3.030 | 34.0 | FIG. 5 |

Compared with the results from Example I, diagram 2, FIG. 2, one can see that the precipitating agent is removed from the precipitated protein material in the same way. For organic sulphonates and sulphates the degree of recovery is comparable, while it is substantially lower for aluminum sulphate. Nevertheless it is obvioius that the method as claimed is generally applicable for removing precipitating agents from precipitated protein material in such a form that they can be re-used.

The process according to the invention also will be elucidated by means of the following examples showing the dewatering effect according to the present process.

EXAMPLE VI

Samples of 100 ml of a proteinaceous sludge from precipitation of effluent from a butchery by means of lignosulphonic acid, said sludge containing 14.7 % of solids, 7 % of which being protein, were supplied with various chemicals in beakers, and after thorough admixing, the mixture was heated to the boiling point in 6 minutes.

The mixture was then rapidly transferred to a graduated cylinder for observation of the sedimentation properties after the coagulation.

The table below shows the test results.

TABLE FOR EXAMPLE VI

| Admixture | ml. clear phase | | % solids in clear phase |
|---|---|---|---|
| | AFter 15 min. | After 30 min. | |
| No admixture | 5.4 | 7.0 | 1.7 |
| " | 8.5 | 9.5 | 1.7 |
| Pig blood; 10 % by volume | 17.5 | 24.5 | 2.0 |
| Pig blood; 20 % by volume | 29.0 | 36.0 | 1.8 |
| $Ca(OH)_2$; 1 g/l | 32.0 | 41.5 | 1.9 |
| $Ca(OH)_2$; 2 g/l | 37.0 | 38.0 | 2.5 |
| $Ca(OH)_2$; 1 g/l + pig blood; 20 % by volume | 31.5 | 43.5 | 2.3 |

EXAMPLE VII

A sludge from a combined dairy, butchery and municipal effluent precipitated by aluminum sulphate and containing 3.5 % solids and approximately 0.5 % proteins was coagulated in the same manner as in Example I.

The table below shows the test results.

TABLE FOR EXAMPLE VII

| Admixture | ml. clear phase | | % solids in clear phase |
|---|---|---|---|
| | After 15 min. | After 30 min. | |
| No mixture | 10.5 | 16.5 | 0.4 |
| " | 11.0 | 18.0 | 0.4 |
| Pig blood; 1 % by volume | 36.5 | 53.0 | 0.5 |
| Pig blood; 2 % by volume | 39.0 | 57.5 | 0.6 |
| $Ca(OH)_2$; 0.5 g/l | 46.0 | 73.5 | 0.3 |

EXAMPLE VIII 190 l of a proteinaceous sludge from precipitation of effluent from a butchery by lignosulphonic acid, said effluent containing 12.25 % of solids, was mixed with 60 l waste blood containing 10.92 % of solids. After thorough admixing the mixture was heated slowly to 75°C, whereby an initial coagulation without separation of water could be observed.

The conditioned mixture was pumped through a coagulator where the mixture was rapidly heated to approximately 90°C by direct exposure to steam.

The coagulated mixture was then separated in a desludger (Alfa-Laval NX-214), and the concentrated sludge was collected. A composition test was made of the separated water. Yield: 61 kg concentrated sludge containing 39.6 % solids.

Content ≅ 24.2 kg of solids of totally 30.0 kg of solids originally.

The content of solids in the separated water was 2.04 %.

I claim:

1. A process for coagulating and agglomerating a proteinaceous aqueous sludge, previously precipitated with a precipitating agent, separating said sludge from the water therein contained, and recovering the precipitating agent comprising the sequential steps of;
   a. mixing said sludge with, calcium chloride
   b. adjusting the pH to a value in the range of 6.5–9.5 by adding a base selected from the group consisting of alkali metal hydroxides and alkaline earth metal hydroxides,
   c. heating said mixture to a temperature in the range of 60°–120°C in order to coagulate and agglomerate said sludge, whereby an aqueous phase containing the precipitating agent and a coagulated protein phase are formed, and
   d. separating said aqueous phase containing the precipitating agent from said coagulated protein phase.

2. A process according to claim 1 wherein a heat coagulable protein selected from the group consisting of blood, comminuted meat and albumin also is added to the mixture in step (a).

3. A process according to claim 1 wherein said base is sodium hydroxide.

4. A process according to claim 1 wherein said base is calcium hydroxide.

5. A process according to claim 1 wherein said heating step (c) is carried out in two stages, by first preheating said mixture with agitation until the proteinaceous material begins to coagulate, and then forming a continuous stream of said precipitated mixture and heating the mixture rapidly to a temperature in the range of 60°–120°C by injecting steam into the stream of said preheated mixture.

6. A process according to claim 1 wherein said separated coagulated protein is washed with warm water.

7. A process according to claim 1 wherein said heating is carried out by injecting super-heated steam into the mixture.

8. A process according to claim 7, wherein said super-heated steam is injected into the mixture for a period of at least 2 minutes.

9. A process according to claim 1 wherein said separation step is carried out by centrifugation.

10. A process according to claim 9 wherein said heated mixture is cooled before the separation step is carried out.

* * * * *